Aug. 20, 1957   D. GUTZMANN   2,803,051
TOOL FOR MAKING ORNAMENTAL ARTICLES
Filed Oct. 29, 1954   3 Sheets-Sheet 1

Inventor
Dorothea Gutzmann
Joshua R H Potts
Att'y

Aug. 20, 1957 D. GUTZMANN 2,803,051
TOOL FOR MAKING ORNAMENTAL ARTICLES
Filed Oct. 29, 1954 3 Sheets-Sheet 2
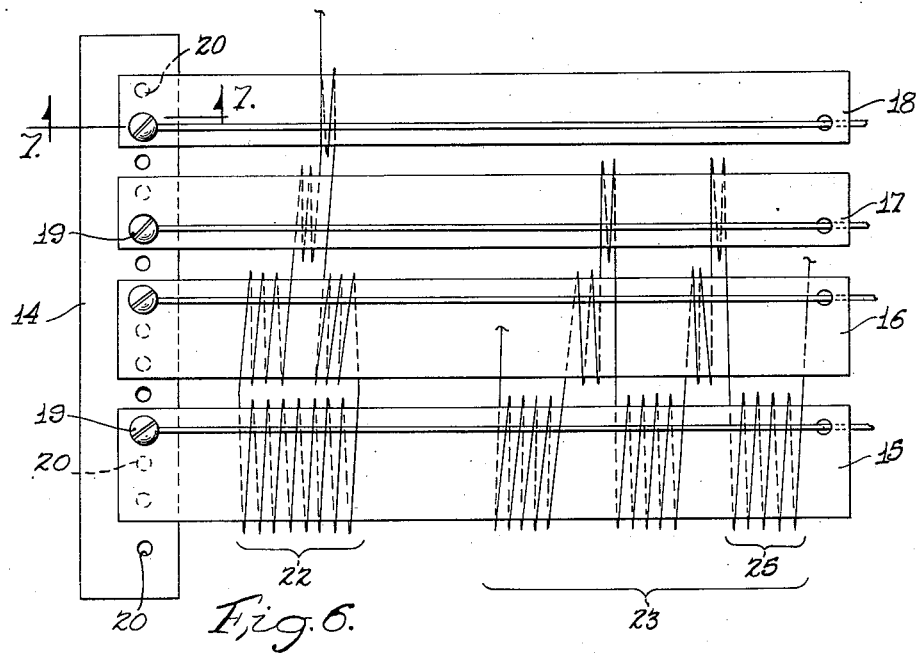
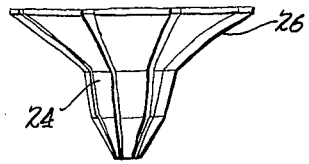
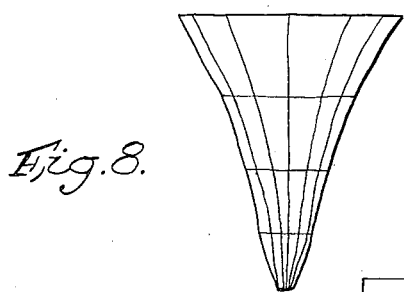
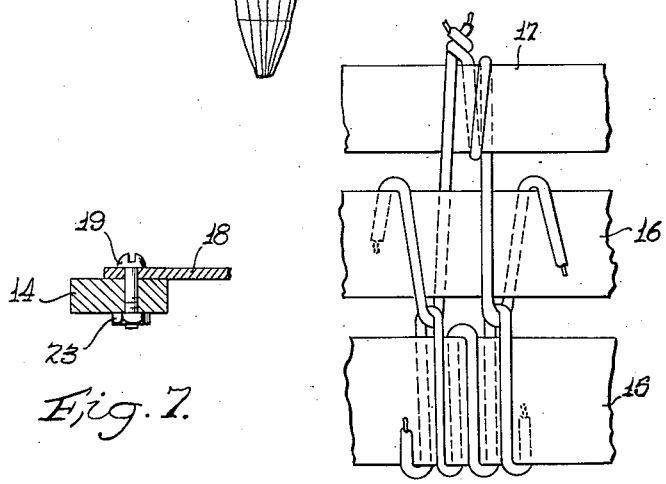
Inventor
Dorothea Gutzmann
Joshua R. H. Potts Atty Aug. 20, 1957 D. GUTZMANN 2,803,051
TOOL FOR MAKING ORNAMENTAL ARTICLES
Filed Oct. 29, 1954 3 Sheets-Sheet 3
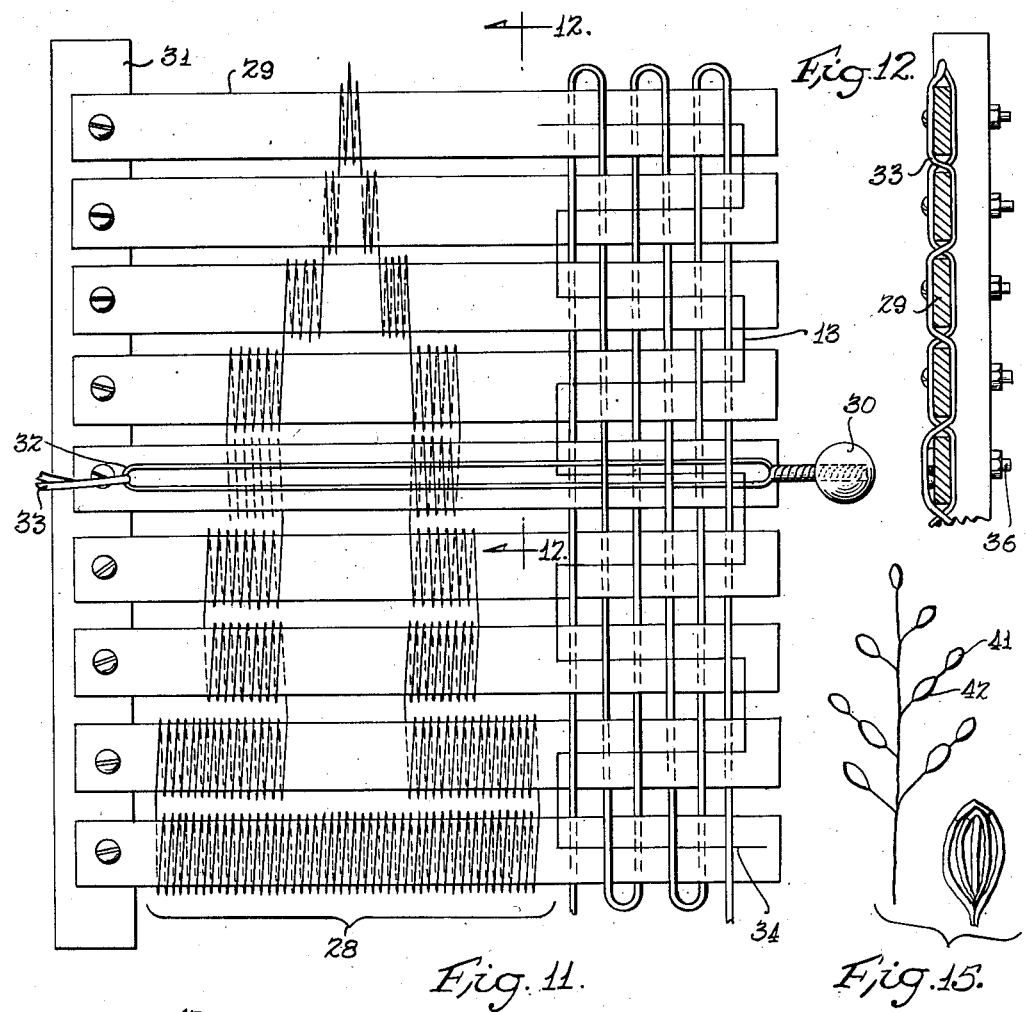
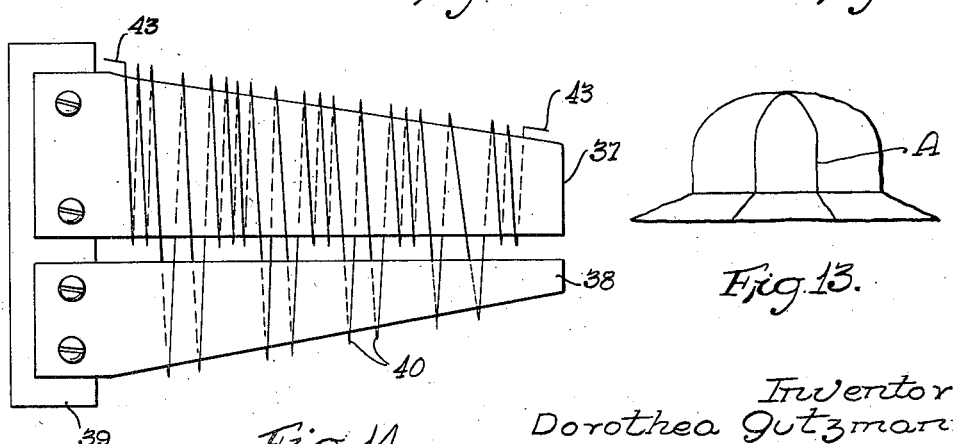
Inventor
Dorothea Gutzmann
Joshua R. H. Potts
Att'y

United States Patent Office 2,803,051
Patented Aug. 20, 1957

2,803,051

TOOL FOR MAKING ORNAMENTAL ARTICLES

Dorothea Gutzmann, Chicago, Ill.

Application October 29, 1954, Serial No. 465,639

2 Claims. (Cl. 28—15)

This invention relates to equipment and methods for producing artistic designs which are embodied with a wide range of practical items and provides especially for the use of cord, wire or ribbon loopings, lacings and weavings and the like whcih are more or less a part of the material structure of the articles with which such designs are associated, and the invention described and claimed herein is kindred to the inventions covered by my Patents Numbers 2,305,869 and 2,337,099, dated December 22, 1942, and December 21, 1943, respectively.

A primary object of the invention is to provide sets of definite tools for the above indicated purposes which make possible the producing of more extensive and more complex, uniform or varied designs at an expedient rate of production.

It is an important object to make possible tools of this nature which facilitate the teaching of their use to beginners, apprentices and students in carrying out various designs and arrangements, and to cultivate the movements required in applying yarn, or tufted wire or other cord and ribbons to artistic items.

It is also an important object to provide a set of tools including a plurality of needle bars of different thickness, width, length, and shape as desired to concurrently or otherwise mount loops and sets of loops and thus permit the extensive formation of items appearing in nature such as flowers, leaves and branches.

It is one of the principal objects to provide tools of convenience with which superior and original designs may be carried into effect in accordance with the ability of the worker, and to embody such designs with practical items such as hats, ornamental corsages, purses and earrings, giving to such articles distinct, attractive and artistic qualities.

It is also an important object to carry out different connected decorative and ornamental designs and different parts of designs upon different size and shape needle bars, respectively, which may or may not be related components of a general design, depending upon the requirements of each undertaking, such designs including either single, double, plural or multiple features and colors as desired.

It is also an object in conjunction with using a plurality of needle bars at the same time as above indicated, to provide for quickly and simultaneously withdrawing the bars from the work after slip wires are applied, said slip wires maintaining the arrangements of the different sets of loops so that tie wires may be used as required to more permanently establish the relation of the different loops and lacings.

It is an important object to provide tools and the method of adding and connecting loops of yarn, chenile, or other wire enforced cord or the like in two or more directions, meaning both side by side and end to end, and to vary the number and frequency of loops added in one direction without regard to the number added in another direction and to vary the size of such loops as desired.

It is also an object to provide tools and methods by which lopings and weavings are made which may be formed into either flat, curved, conicle or spherical material as required, and to combine either of such materials for any area and shape required or for the same continuous or broken sections of the product being made, as desired.

It is another object to provide for inserting loops of different color either individually or in groups in making stripes, strips, blocks or other formations as desired.

Other objects and purposes will appear hereinafter and be explained in view of the accompanying drawing in which similar characters of reference designate similar parts throughout the different views in which:

Fig. 6 shows four material arranging needle bars with respective ends secured to a common head strip, and illustrates diagrammatically how the flower material is arranged on same in making tubular and semi-tubular flowers.

Fig. 7 is a fragmentary sectional view taken in the proximity of line 7—7 of Fig. 6.

Fig. 8 is the side view of a tubular flower the material of which is initially arranged as shown diagrammatically in Fig. 6.

Fig. 9 is the side view of a semi-tubular flower, the material of which is arranged as shown diagrammatically in Fig. 6.

Fig. 10 shows a method of constructing the flowers shown in Fig. 5, Fig. 8 and Fig. 9, from material of different colors.

Fig. 11 shows the invention carried out with a larger number of needle bars, fixed in definite relation to each other, and illustrates the method of looping and weaving material for the hat shown in Fig. 13 and the like.

Fig. 12 is a sectional view taken in the proximity of lines 12—12 of Fig. 11.

Fig. 13 is the side view of an unfinished hat made on the bars shown in Fig. 10.

Fig. 14 shows the invention constructed with tapered bars.

Fig. 15 shows a sample of leaves made on the tapered bars shown in Fig. 14.

Figure 1:
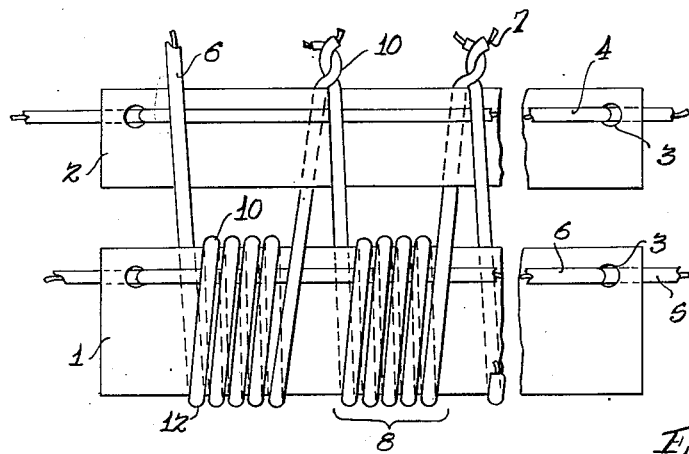
Fig. 1 and Fig. 2 illustrate arranging the flower making material on two needle bars.

It will be understood that the drawing is in some particulars appropriately more of a diagrammatic showing than a true drawing.

Figure 2:
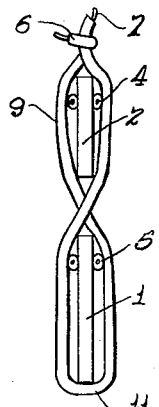

Referring to Fig. 1 and Fig. 2 the numeral 1 designates a petal material arranging needle bar for the flare part of flower petals or the like and 2 designates a material arranging bar for the normally lower part of the petals. The two bars are manually held and kept substantially parallel and spaced apart while in use. Each bar forms a hole 3 at each end thereof through which slip cords 4 and 5 are strung and thus held in position along respective bars. In this example the flower petal material consists of fluffy chenile cords 6 with twisted wire centers 7 and each of the cords is wound around the bar 1 and slip cord 5 for shaping and arranging sets of petal making loops 8, the cords being crossed between said bars and the loop formed by the adjoining cord end portions 9 to straddle the adjacent edge of the bar 2.

The adjoining cord portions are twisted together at the other edge of the bar 2 for holding the material in position on the bars as shown at numeral 10.

Figure 5:
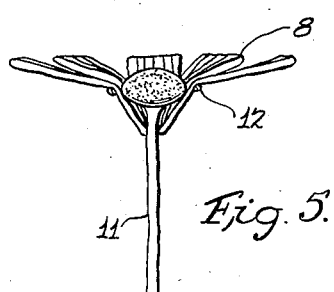
Fig. 5 is a sectional view taken in the proximity of line 5—5 of Fig. 4.
Figure 3:
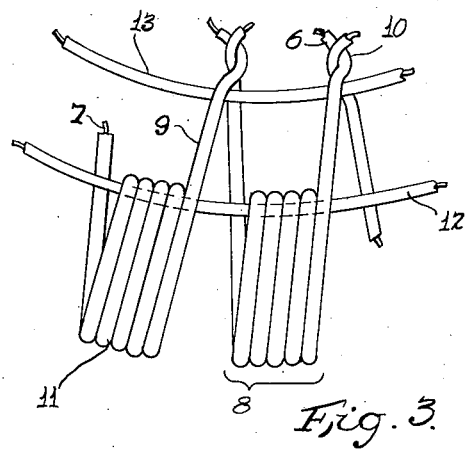
Fig. 3 shows the method of gathering the arranged material into the general form of a flower.
Figure 4:
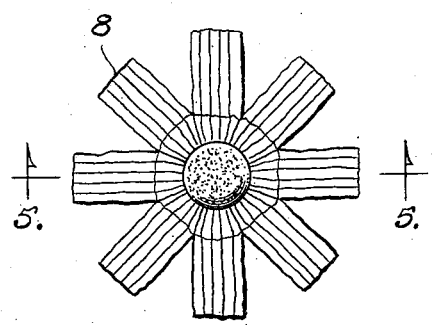
Fig. 4 is the plan of a flower produced as illustrated in Fig. 1, Fig. 2 and Fig. 3.

While the petal material is still on said bars selected ones of the loops 8 are tied together with tie wire or the like as may be required to define the petals being made and adjacent loop ends 11 are twisted together for a finished petal edge. The ends of the slip cords 4 and 5 are then withdrawn from the holes 3. After the bars are withdrawn the slip wires serve to temporarily maintain the arrangement of the loops. Said slip wires are temporarily twisted or otherwise attached to tie wires 12 and as said slip wires are withdrawn they are ordinarily used to draw the tie wires through the loops which are used as gathering strings to bring all of the sets of petal loops 8 together as illustrated in Fig. 3. All of the sets of petal loops are thus swung and tied into flower forming relation and anchored in place as shown in Fig. 4 and Fig. 5. It should be understood that the slip cords 4 and 5 may be made of any suitable gathering string material if preferred so that the slip cords themselves may if desired serve in gathering the sets of loops and stem material together and tying same.

Referring to Fig. 5 it will be noted that at the normally lower end of the flower the lower one of the gathering string wire has served to draw the loops together to form a hole through which the stem 13 has been inserted from above, said stem having a flower center piece at its upper ends which nests in the small end of the flower as shown.

The loops in the sets 8 are increased or diminished in number, and the number of sets of loops is varied at will to make flowers of different characters as will be well understood in art.

Referring to Fig. 6 the numeral 14 designates a head strip to which one end of each of the needle bars 15, 16, 17 and 18 is secured at approximately right angles thereto, one of the bolts 19 passing through an end hole of each of said bars and thence through selected ones of the holes 20 of the head 14 to engagement with one of the nuts 21 as illustrated in Fig. 8. Still referring to Fig. 6 the flower material windings are illustrated as wound for making the flowers shown in Fig. 8 and Fig. 9 by diagrams 22 and 23 respectively.

The diagram 23 is in a category as to material arrangement with Fig. 1, but extends over three bars instead of only two so that the central bar 16 may receive the loop material for the swell 24 of the flower shown in Fig. 9 it being noted that the flower of Fig. 1 does not have as much swell. The sets of loops 25 on bar 15 are the windings for the flared part of the petals indicated at 26 and the number of loops on the bar 16 should be fewer than the loops on bar 15 in the necessary proportion to make the proper size swell 24 in relation to the flare 26. The stem material which straddles the bar 17 is handled in the same manner as the end portions 9 of Fig. 1 and is twisted as shown at 10 of Fig. 1 for keeping the material in position on the bars. The slip wires 27 are handled with tie wires the same as explained in regard to the slip wires 4 and 5 in view of Fig. 1 and Fig. 3.

In Fig. 10 a way of making the flower shown in Fig. 9 of two colors as illustrated by which method the needle bars 16 and 17 are wound and laced with material similarly to the way the bars 1 and 2 of Fig. 1 are wound, after which material of a different color for the flare part 26 of the petal is wound around on the bar 15 and at the same time laced at intervals with the material on bar 16, the intervals being spaced to get enough more material on bar 15 as required for said flare. As an example the material wound on bar 15 may be pink and the material on bars 16 and 17 may be green, which will give the flower a very pleasing and natural appearance.

The diagram 22 shows a method of arranging flower material for the tubular class of flowers in which in this instance the material is wound and laced onto the four bars 15, 16, 17 and 18, the number of loops on successive bars being gradually decreased so that the swell of the flower is gradual and the material for the mouth of the flower being wound on the bar 15. Different color material may also be applied as desired to one or more of the bars in making tubular flowers, the differently colored materials being laced together as explained in reference to Fig. 10.

Fig. 12 and Fig. 11 show my invention of a size and proportion suitable for making the segments A of the hat shown in Fig. 13 the diagrammatic lines 28 showing the arrangement of the loops on the bars 29 which are fixed to the head strip 31. In this operation the tie wires, gathering strings or the like are drawn along under said loops by the threader 30. Said threader is inserted at one side of said diagram along the bars 29 within the respective loops and said tie wire is threaded through the receiving end 32 of the said threader which is withdrawn to pull the tie wire 33 along in working position within the loops, this part of the operation being repeated along each of said bars. One set of draw strings are preferably applied to all the segments of a single hat being thus made, although a set of draw strings for each segment may be provided and connected later to the draw strings of another segment. In both methods, the draw strings are used to pull the hat into shape as shown in Fig. 13 in the same manner as in making either a hat, flower or leaf the unit thus produced is manually or otherwise bent and styled at will.

Still referring to Fig. 11 a method of making a band or flat decoration for a hat or the like is carried out by lacing chenile or yarn between and over the bars 29, the chain B being drawn through the loops thus made by the threader 30 as in the case of making a hat segment as explained above. In order to make such band or ribbon longer if desired the unfinished end of the length just completed is applied to the first or last of the bars 29 in the same relation as between the other loops and bars so that the weave may be continuous the material being applied to said bar the same as, to the adjacent bar at any interval, and then laced over and between the other bars depending upon the length to be made the threader being applied as before. It will be noted that the bars 29 are each supported at respective ends on the head strip 31 which has notches 33, said notches fit the respective bars and hold same in true working position being thus retained by bolts 36.

Fig. 14 shows a method of using two tapered bars 37 and 38 which are secured to the head strip 39 for producing designs such as the leaf arrangements as shown in Fig. 15, the material being looped about the tapered bar 37 and selected loops 40 being extended and also formed around tapered bar 38. Said selected loops are used in making the leaves 41 which extend from the leaves 42 of Fig. 15. Selected sets of loops on the adjoining loop line 43 are swung over on said line for leaves which extend oppositively from the ones left on the same side of said adjoining line.

While I have shown and described my preferred form of construction and operation I do not wish to be limited to the precise details shown and described but wish to avail myself of all the variations coming fairly within the scope of the appending claims.

The invention claimed is:

1. In a tool intended to be used in making works of art from stranded material, a head strip formed with a series of openings, a plurality of bars of different widths and having an opening at each end thereof, and a nut-and-bolt assembly cooperating with an opening at one end of each bar and one of the openings in the head strip for securing said bars to said head strip in a position in which they outstand therefrom, said bars being adapted to have stranded material looped thereover in various patterns with holes in said bar being adapted to receive a slip cord.

2. In a tool intended to be used in making works of art from stranded material, a head strip formed with a series of openings, a plurality of bars of different widths secured to said head strip and outstanding therefrom and arranged in sequential order with the narrowest bar at one end of said head strip and the widest bar at the other end, each of said bars being formed with an opening at each end thereof adapted to receive a slip cord.

References Cited in the file of this patent

UNITED STATES PATENTS

| | | |
|---|---|---|
| 2,305,869 | Gutzmann | Dec. 22, 1942 |
| 2,337,099 | Gutzmann | Dec. 21, 1943 |
| 2,655,017 | Scott | Oct. 13, 1953 |